US012560310B2

(12) United States Patent
Yang et al.

(10) Patent No.: US 12,560,310 B2
(45) Date of Patent: Feb. 24, 2026

(54) STRAP LIGHTING

(71) Applicant: Kuzco Lighting LLC, Las Vegas, NV (US)

(72) Inventors: Nathan Yang, Surrey (CA); Ryan Pauly, New Rochelle, NY (US)

(73) Assignee: Kuzco Lighting LLC, Las Vegas, NV (US)

( * ) Notice: Subject to any disclaimer, the term of this patent is extended or adjusted under 35 U.S.C. 154(b) by 0 days.

(21) Appl. No.: 18/807,581

(22) Filed: Aug. 16, 2024

(65) Prior Publication Data

US 2025/0075890 A1 Mar. 6, 2025

Related U.S. Application Data

(60) Provisional application No. 63/536,693, filed on Sep. 5, 2023.

(51) Int. Cl.

| | |
|---|---|
| ***F21V 21/008*** | (2006.01) |
| ***D03D 1/00*** | (2006.01) |
| ***F21V 21/088*** | (2006.01) |
| ***F21V 23/00*** | (2015.01) |
| ***F21V 23/06*** | (2006.01) |
| ***F21Y 115/10*** | (2016.01) |

(52) U.S. Cl.

CPC ......... *F21V 21/008* (2013.01); *D03D 1/0088* (2013.01); *D03D 1/0094* (2013.01); *F21V 21/088* (2013.01); *F21V 23/001* (2013.01); *F21V 23/06* (2013.01); *F21Y 2115/10* (2016.08)

(58) Field of Classification Search

CPC .... F21V 21/008; F21V 21/088; F21V 23/001; F21V 23/06; D03D 1/0088; D03D 1/0094; F21Y 2115/10

See application file for complete search history.

(56) References Cited

U.S. PATENT DOCUMENTS

| | | | | |
|---|---|---|---|---|
| 3,708,608 A * | 1/1973 | Wyman | F21V 21/002 | 439/425 |
| 5,051,877 A * | 9/1991 | Liao | F21S 4/10 | 362/249.16 |
| 5,158,360 A * | 10/1992 | Banke | F21V 21/008 | 439/425 |
| 5,228,774 A * | 7/1993 | Liao | H01R 12/67 | 362/396 |
| 5,446,640 A | 8/1995 | Lin | | |
| 5,622,425 A * | 4/1997 | Lin | F21V 21/002 | 362/249.14 |
| 5,743,758 A | 4/1998 | Cheng et al. | | |
| 5,876,236 A | 3/1999 | Chen | | |
| 6,095,847 A * | 8/2000 | Lin | F21V 19/006 | 439/280 |
| 11,020,285 B1 | 6/2021 | King et al. | | |
| 2004/0009729 A1* | 1/2004 | Hill | D03D 11/00 | 442/181 |
| 2015/0170480 A1* | 6/2015 | Chen | F21V 33/0008 | 362/396 |

(Continued)

*Primary Examiner* — Tsion Tumebo

(74) *Attorney, Agent, or Firm* — DLA Piper LLP (US)

(57) ABSTRACT

A modular lighting system wherein a flexible fabric is woven with conductive material and connected to a power source. A modular and repositionable light module is then electrically connected to the flexible fabric and thereby power the light module by way of the woven conductive material.

7 Claims, 6 Drawing Sheets

(56) References Cited

U.S. PATENT DOCUMENTS

| | | | | |
|---|---|---|---|---|
| 2019/0341718 | A1* | 11/2019 | Yu | F21V 21/096 |
| 2020/0069250 | A1* | 3/2020 | Chahine | D04B 1/22 |
| 2022/0045467 | A1 | 2/2022 | MulHolland | |
| 2022/0181808 | A1 | 6/2022 | Diez | |
| 2022/0338572 | A1* | 10/2022 | Knies | A44B 17/0064 |
| 2025/0075891 | A1 | 3/2025 | Yang et al. | |

* cited by examiner

STRAP LIGHTING

CROSS-REFERENCE TO RELATED APPLICATION

This application claims the benefit of, and priority to, U.S. Provisional Application No. 63/536,693 filed on Sep. 5, 2023, which is hereby incorporated by reference in its entirety.

TECHNICAL FIELD

This application relates to the field of lighting and lighting fixtures and/or interaction between the component parts of a lighting fixture assembly.

BACKGROUND

Previously, lighting fixtures suffered from inherent drawbacks based on their inability to be customized and arranged in areas that were unfit for traditional wall or ceiling mounts. There is a great need for a new customizable lighting system for interior or exterior of the home or office in areas that are inaccessible to traditional wall or ceiling mounts.

SUMMARY

Systems and methods here include improved lighting systems wherein a flexible fabric is woven with conductive material and connected to a power source. A modular and repositionable light module is then electrically connected to the flexible fabric and thereby power the light module by way of the woven conductive material.

Additionally or alternatively, systems and methods may include a flexible fabric ribbon with a length longer than a width, wherein the ribbon includes two parallel lines of conductive material running substantially along the length, a power source at a first end of the flexible fabric ribbon in electrical communication with the two parallel lines of conductive material of the flexible fabric ribbon, a light source configured with a pair of surface electrical contacts, wherein the light source includes a clamp. In some examples, the flexible fabric ribbon is woven. In some examples, the two parallel lines of conductive material include steel threads. In some examples, power source is a constant voltage power source with an on/off switch. In some examples, the light source includes an LED light in electrical communication with the pair of surface electrical contacts.

Some examples further include, additionally or alternatively, an opposite end bar connecting the pair of parallel woven conductive material on a second end of the flexible fabric ribbon opposite the first end of the power source. In some examples, additionally or alternatively, the clamp includes a resistance arm which is configured to open and allow the flexible fabric ribbon to slide within the clamp, and also configured to close to secure the flexible fabric ribbon within the clamp. In some examples, additionally or alternatively, the pair of surface electrical contacts include spring mounts to bias each surface electrical contact away from the light source to better connect to the flexible ribbon pair of parallel woven conductive material.

In some examples, additionally or alternatively, the light source includes a plate to secure the pair of surface electrical contacts to the two generally parallel lines of electrically conductive material of the flexible strip or ribbon. In some examples, additionally or alternatively, the plate includes bolts and nuts to secure the light source to the ribbon or strip and corresponding pair of electrical contacts to the two generally parallel lines of electrically conductive material of the flexible strip or ribbon. In some examples, additionally or alternatively, the plate includes screws to secure the light source to the ribbon or strip and corresponding pair of electrical contacts to the two generally parallel lines of electrically conductive material of the flexible strip or ribbon.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the disclosures to these particular embodiments.

Overview

The light system described here may utilize a flexible fabric woven with electrically conductive material to connect a power source to a light source. In such a way, the light source may be clamped or otherwise secured to the flexible fabric and thereby connected to the power source. Such arrangements may allow for light sources to be located in areas that are suspended, hanging, or slung between or over areas that a traditional wall or ceiling mount may not be able to achieve. Additional or alternatively, such arrangements may be movable, adaptable, changeable, and otherwise adjustable such that the light modules may be swapped out, changed, positioned, repositioned, and customized in innumerable combinations and permutations.

Figure 1:
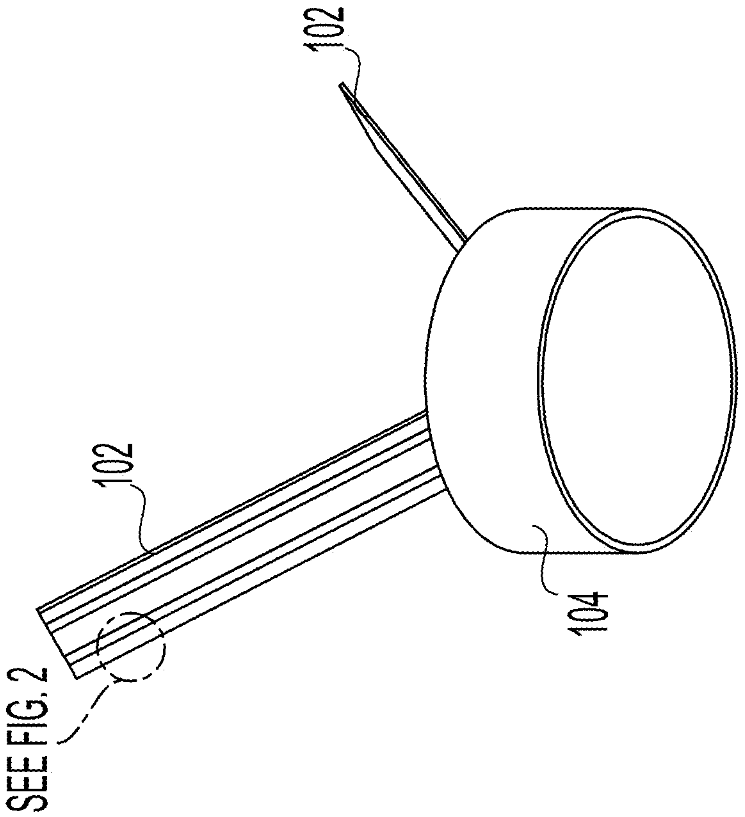
FIG. 1 is an example diagram of a lighting fixture according to embodiments described herein.

FIG. 1 shows an example of a light fixture 104 attached to and powered by a strap 102. The light fixture has no other connections to a surface and is both powered by and supported by the strap 102.

Strap Examples

In the systems and methods described herein, the straps may be used not only to support any number of light fixtures, but also to power and control the operation of the same light fixtures. Such a design allows for light fixtures to be able to be arranged in novel ways such as hung from a strap on a wall, traversing an area with two ends of a strap secured but a middle suspended, wrapped around a pole or object.

Additionally, the strap design allows for the customization of light fixtures attached to the straps. Not only can such light fixtures be arranged on any place on a strap, any number of lights may be arranged, rearranged, swapped, changed, altered, moved or customized. Because little or no hardware may be necessary to attach the example light fixtures to the strap, the user case of customization and arrangement may be achieved.

Figure 2:
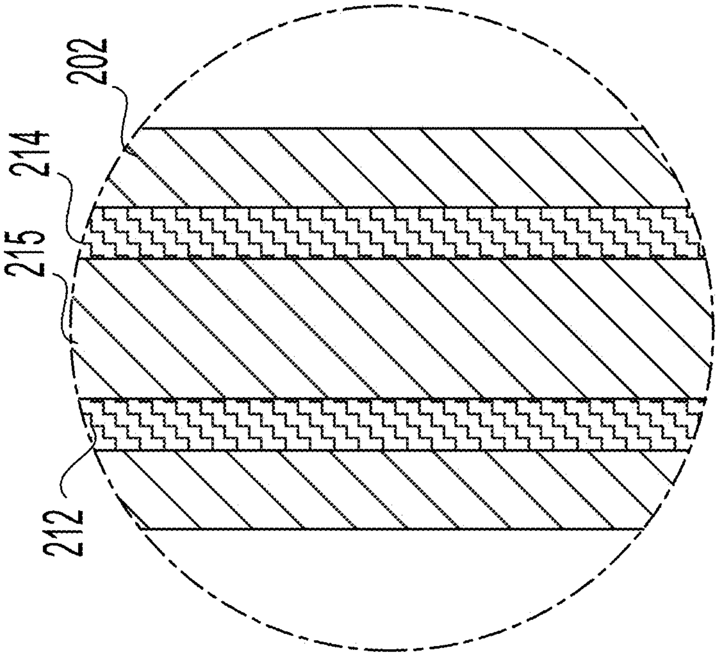
FIG. 2 is an example detail diagram of a lighting fixture strap according to embodiments described herein.

FIG. 2 shows a detail close up detail of the strap 202 as described herein. The strap may be made of any kind of material such as plastic, nylon, rubber, leather, elastic, cotton, or any blend of any of these or other materials. The strap may be woven, plaited, braided or assembled in any fashion including a solid piece of material. In many examples, the strap is flexible and able to be wrapped around an object or affixed to a surface at least at one end and in some examples two ends, and in some example intermediary portions of the strap between the two ends. In some examples, the strap is or includes plastic, nylon, cotton, Kevlar, carbon fiber, rubber, lycra, or any other kind of flexible material.

In some examples, the strap has a thickness of ¼ inch and a width of two inches. In some examples, the strap has a thickness of $\frac{1}{8}^{th}$ inch, $\frac{3}{8}^{th}$ inch, or any other thickness. In some examples, the strap may have a width of ¾ inch, one inch, 1¼ inches, 1½ inches, 1¾ inches, 2 inches, 2¼ inches, 2½ inches, 2¾ inches, 3 inches or any other width.

In some examples, the strap has a length of ten feet. In some examples, the strap has a length of one foot, two feet, three feet, four feet, five feet, six feet, seven feet, eight feet, nine feet, ten feet, fifteen feet, twenty feet, or any other length of strap.

In some examples, the strap includes an electrically conductive material. As shown in FIG. 2, the strap 202 includes conductive material 212, 214 that run the length of the strap or at least a portion of the length of the strap. In such examples, the entirety of the strap includes parallel lines of electrically conductive material 212, 214. Such electrically conductive material may be used to conduct electricity or electric commands from a source to any number of light fixtures attached to the strap as described herein. In some examples, the conductive material 212, 214 may be ⅛ inch wide. In some examples, the conductive material 212, 214 may be ¼ inch wide, ½ inch wide or any width that allows for a gap 215 between the two parallel lines 212, 214.

In some examples, the electrically conductive material 212, 214 is arranged in two parallel rows on the strap, with a gap between the two. In such examples, the strap itself may act as an insulator between the two electrically conductive rows. In some examples, the gap 215 may be ¼ inch wide, ½ inch wide, ¾ inch wide, one inch wide, one and ½ inch wide, or any other distance. In any example, the gap 215 should be wide enough such that the two parallel conductive lines 212, 214 may not touch or get near each other. In such examples, the two parallel conductive lines 212, 214 may be wide enough apart such that the two electric conductors (320, 322 in FIG. 3 etc.) do not touch when secured to the light source. In such examples, the conductive material act as the wires to the light source (104 in FIG. 1). As such, one of the lines of conductive material 212 may be the positive wire and the other line of conductive material 214 may be the negative or neutral wire. Additionally or alternatively, the other line of conductive material 214 may act as the positive wire and the other line of conductive material 212 may act as the negative or neutral wire. The wire arrangement may be determined on how the power unit is arranged as described herein. The electrically conductive lines or rows 212, 214 may provide power and/or electrical commands to any number of light fixtures affixed to the strap as described herein.

Such electrically conductive material may be woven metal wires, metal plaited onto the strap, metal sprayed onto the strap, metal melted onto the strap, metal glued to the strap, metal or any other kind of way to adhere metal or other electrically conductive material to the strap. In such examples, metal may be any electrically conductive material such as but not limited to steel, copper, brass, aluminum, iron, lead, gold, zinc, silver, or any combination or permutation of these or other materials.

By providing power and control of any light fixture attached to the strap, these arrangements may be achieved.

Light Source Examples

The light sources (104 in FIG. 1 for example) may be a typical light source such as an LED, incandescent, fluorescent, halogen, or other light source as known. Such a light source may include a connection to the power source as shown in FIG. 3.

Figure 3:
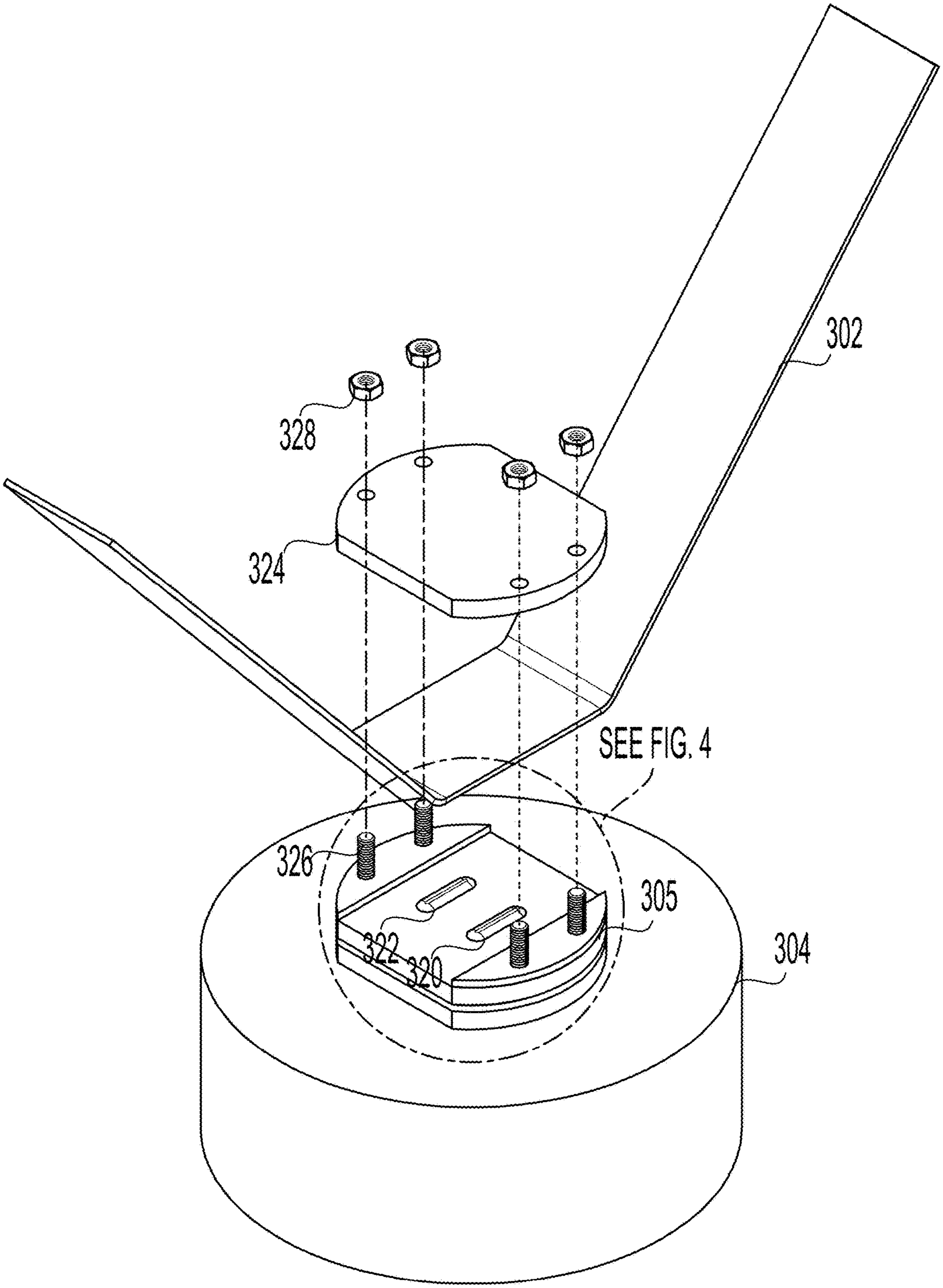
FIG. 3 is an example exploded diagram of a lighting fixture according to embodiments described herein.

As shown in FIG. 3, the light source 304 includes a connection arrangement 305 on the side opposite to the light. The purpose of the connection arrangement is to secure the strap 302 to the light source 304 as well as power and command the light source 304. Included in the connection arrangement 305 are two connectors 320, 322. These connectors 320, 322 may be electrically conductive units that transport electricity to the light source 304. In some examples, these connectors 320, 322 may include compression spring mounts 423 in the connection arrangement 305 that allow for the connectors 320, 322 to be depressed into the connection arrangement 305 if pressure is applied, but also provide a force pushing outward from the connection arrangement 305 to press against the strap 302 and the two respective electrically conductive lines on the strap (212, 214 in FIG. 2). In such a way, a more solid or secure electrical connection may be made of the connectors 320, 322 and the strap 302 with the two respective electrically conductive lines on the strap (212, 214 in FIG. 2). In some examples, each electrical connectors 320, 322 may be ¼ inch long, they may be ½ inch long, in some examples, they may be ⅛ inch long. In some examples they may be ¼ inch wide. In some examples they may be ⅛ inch wide. In some examples, each of the electrical connectors 320, 322 may be spaced apart such that they match up to the strap 302 and the two respective electrically conductive lines on the strap (212, 214 in FIG. 2).

FIG. 3 also shows a screw connector example with bolts 326 mounted in the connection arrangement 305 that fit through holes in the cover plate 324 and nuts 328 secure to the bolts 326. When the strap 302 is fit between the cover plate 324 and connection arrangement 305 and the nuts 328 tightened to the bolts 326, the light 304 is then connected to the strap 302 and secured in place. The light 304 is thereby also electrically connected to the strap 302 by way of the electrical connectors 322, 320 that press onto the two respective electrically conductive lines on the strap (212, 214 in FIG. 2). In such a way, the light 304 may then be both powered and controlled by way of the strap 302 and secured in place on it for mounting and display.

Figure 4:
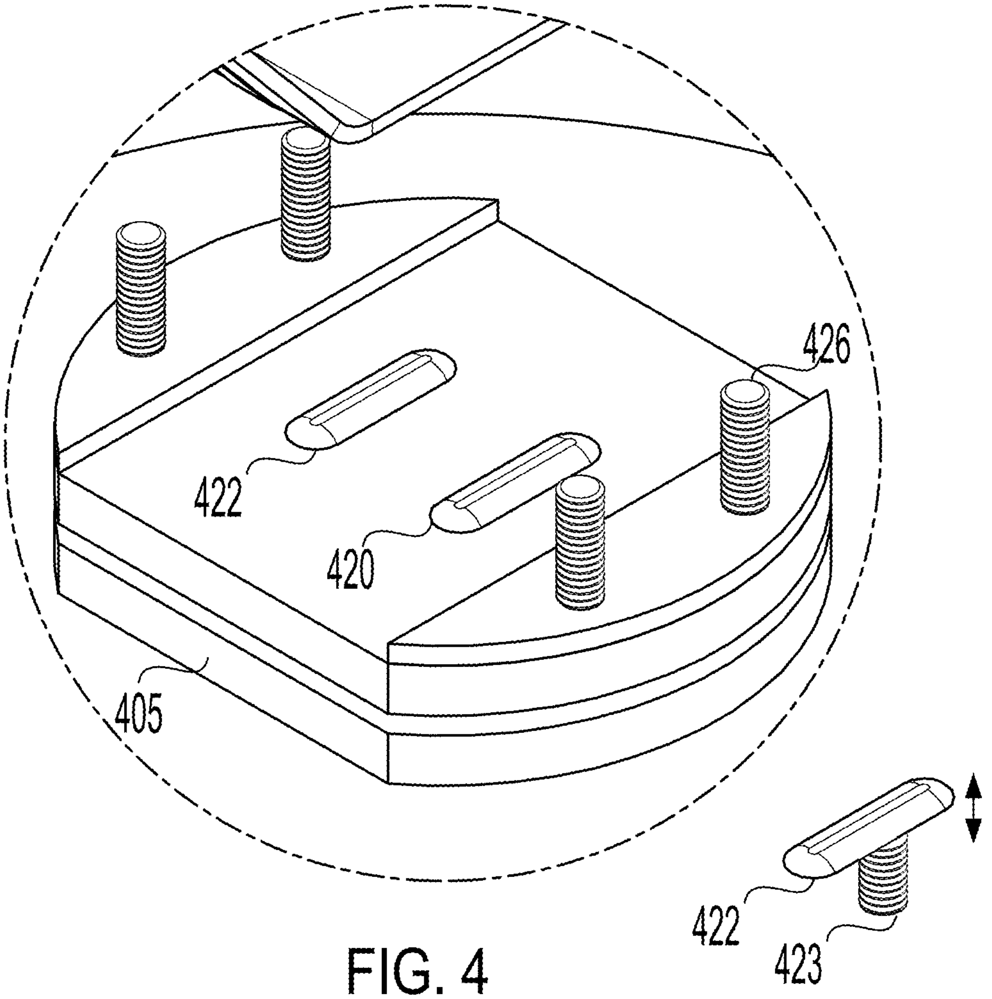
FIG. 4 is an example detail diagram of a lighting fixture connector according to embodiments described herein.

FIG. 4 shows a detail close up of the connection arrangement 405 with the electrical connectors 420, 422 and the bolts 426 for securing to the cover plate and nuts to sandwich and secure the strap to the light. As described, the electrical connectors 420, 422 may be electrically conductive pads made of metal or other electrically conductive material and are wired to the light source as described herein.

Figure 6:
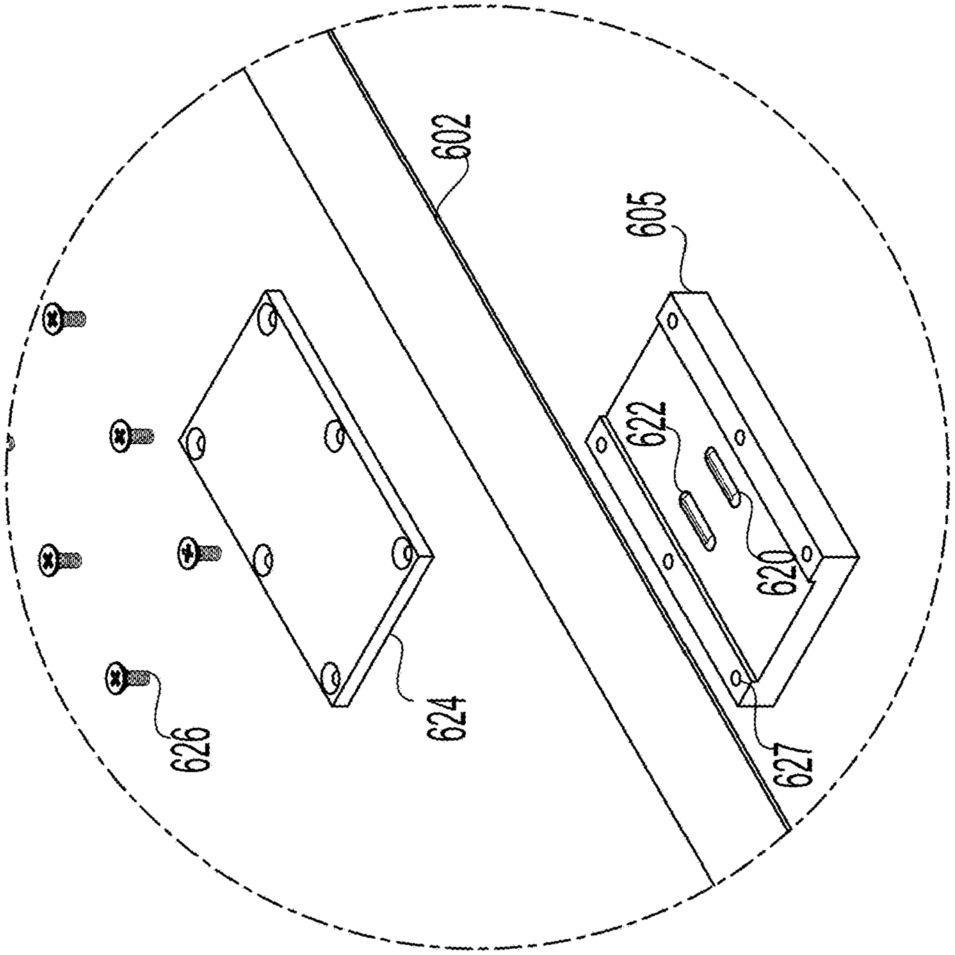
FIGS. 5-6 are example exploded diagrams of lighting fixture screw connections according to embodiments described herein.
Figure 5:
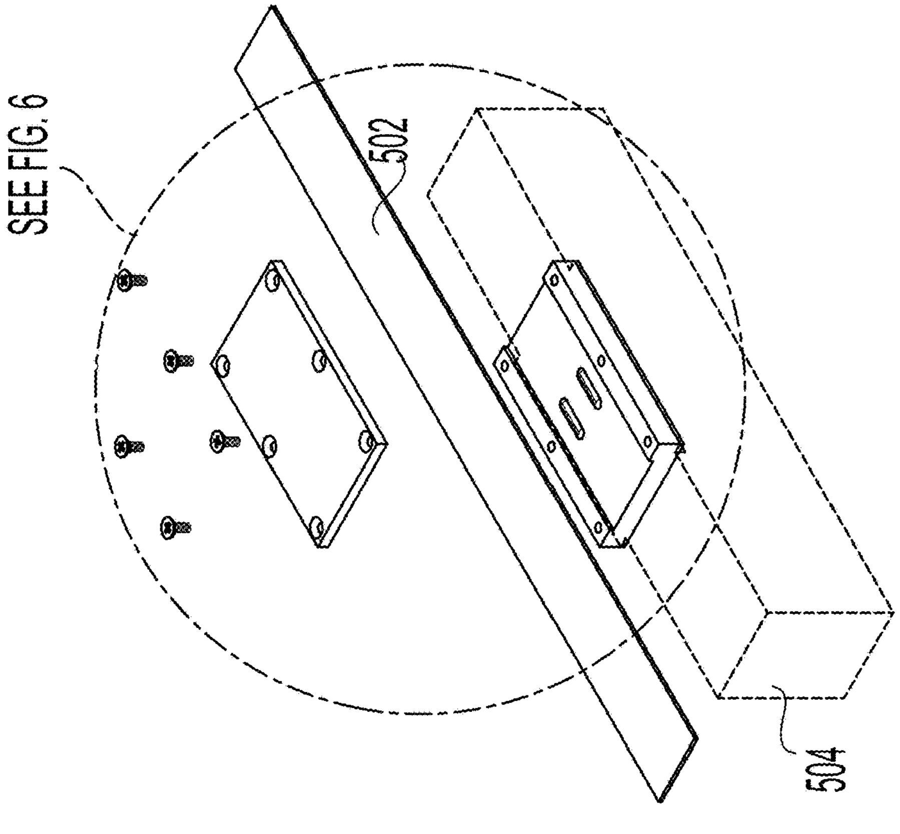

FIG. 5 show an exploded view of another light configuration 504 mounted to the strap 502 by way of the screw arrangement with detail shown in FIG. 6.

FIG. 6 shows a detail of another arrangement of the connection arrangement 605 with electrical connectors 620, 622 and the cover plate 624 which sandwich the strap 602 in place. In the example of FIG. 6, four screws 626 are used instead of nuts and bolts as in FIG. 3. In the example of FIG. 6, the screws 626 are threaded screws that thread into respective holes 627 in the connection arrangement 605 to secure the cover plate to the connection arrangement and thereby sandwich the strap 602 into place and connect the electrical connectors 620, 622 to the respective lines of conductive material (212, 214 in FIG. 2) on the strap 602.

Light Clamp Examples

Light attachments that are attached to the strap as described herein may be used to achieve two purposes: to secure the light fixture to the strap such that the light fixture would not move or slip even if positioned vertically or in a manner that gravity might pull it, and to provide an electrical connection from the connective elements in the strap to the light fixture such that electricity may flow between the two to turn the light in the light fixture on or off, dim, change color, or otherwise command the light.

Figure 8:
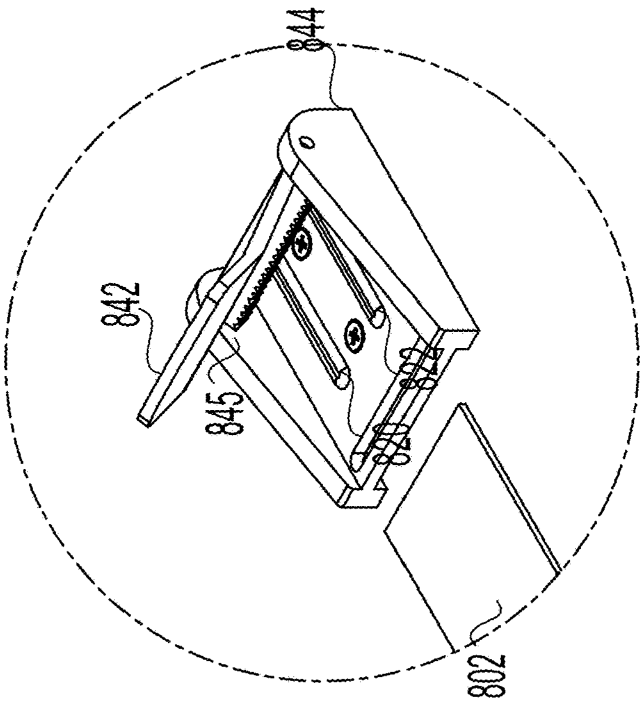
FIGS. 7-9 are example detail diagrams of lighting fixture connection clamps according to embodiments described herein.
Figure 7:
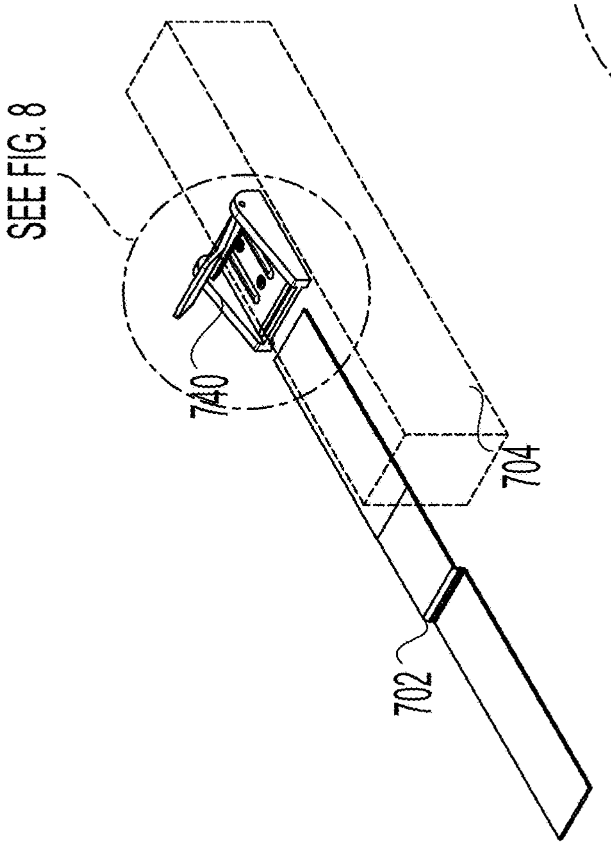

One example light clamp may be a friction fit lever arm clamp. Such an examples is shown in detail of FIGS. 7-9. In FIG. 7, the clamp 740 is shown mounted on any light fixture 704. FIG. 8 shows a detail of the strap 802 which may fit into the clamp 844 and slide through an opening between the clamp body 844 and the friction fit arm 842. In such a way, the electrical connectors 820, 822 on the clamp 844 may be in electrical contact with the respective lines of conductive material (212, 214 in FIG. 2) on the strap 802 and also secured in place.

The clamp (shown in an open position in FIG. 8 and closed position in FIG. 9) may include a row of teeth or knurl bar 845 that may help grab or secure the strap 802 when the friction fit arm 842 is lowered and clamped in place. Any kind of arrangement for the clamp may be used in order to allow for the strap 802 to slide through the clamp 844 when the friction fit arm 842 is open but secured in place when the friction fit arm is closed as shown in FIG. 9.

Figure 9:
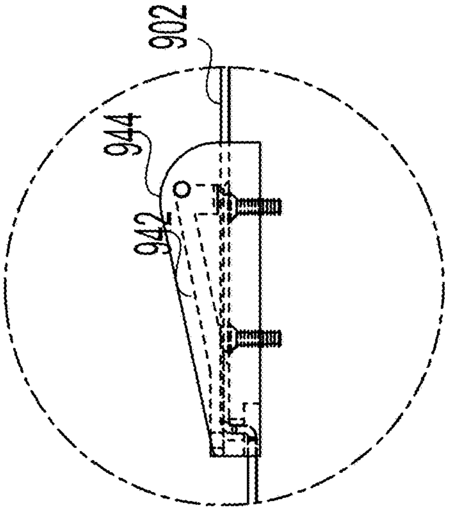

FIG. 9 shows the strap 902 running through the clamp body 944 with the friction fit arm 942 in the closed position. In such a position, the strap 902 is secured in place by the friction fit arm 942 and the electrical connectors (820, 824 in FIG. 8) are in connection with the respective lines of conductive material (212, 214 in FIG. 2).

More Strap Supported and Powered Light Fixture Examples

Figure 10:
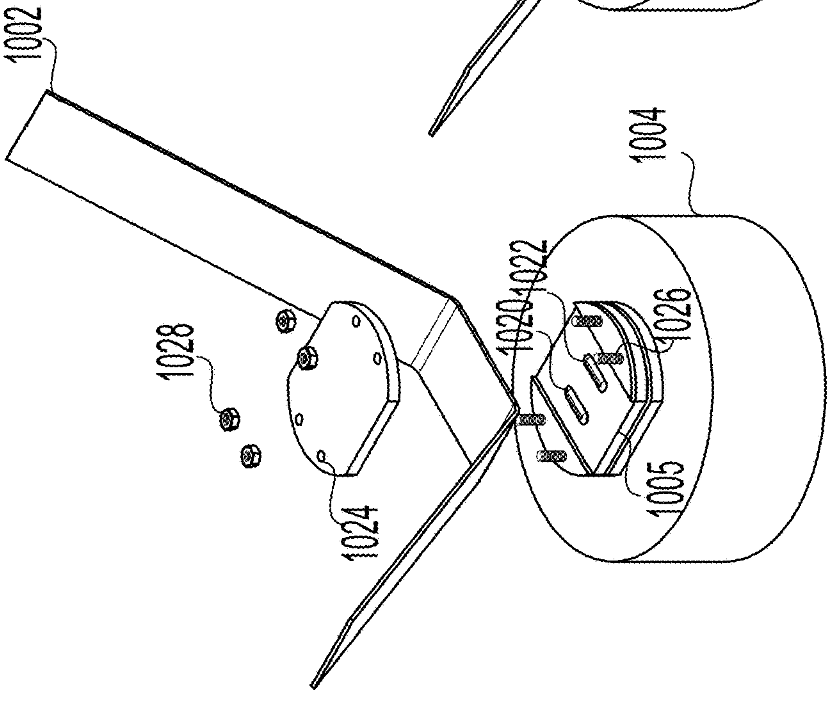

FIG. 10 shows an example light fixture 1004 with the connection arrangement 1005 in an unassembled state with the cover plate 1024 off and the bolts 1026 and nuts 1028 not secured. In this example, the strap 1002 may be placed between the cover plate 1024 and connection assembly 1005 to align the electrical connectors 1020, 1022 to the respective lines of conductive material (212, 214 in FIG. 2) on the strap 1002.

Figure 12:
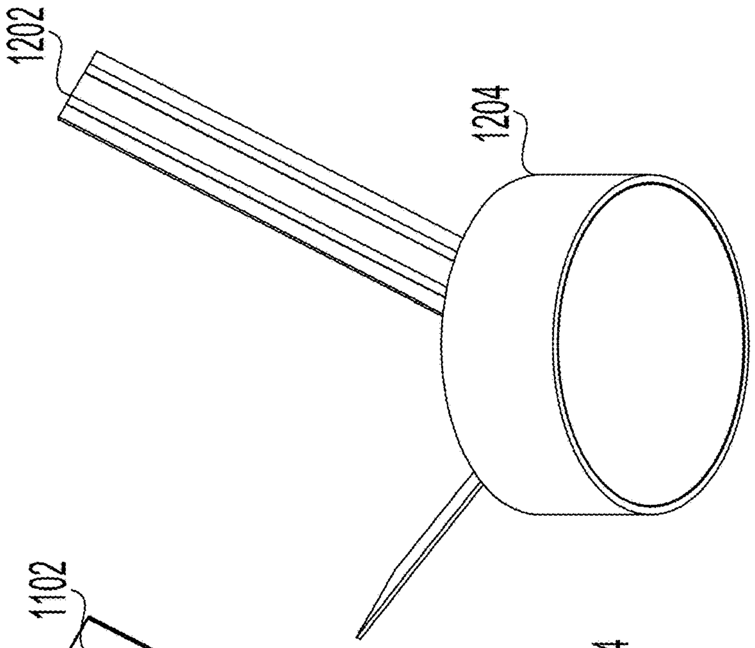
FIGS. 10-12 are example diagrams of a lighting fixture according to embodiments described herein.
Figure 11:
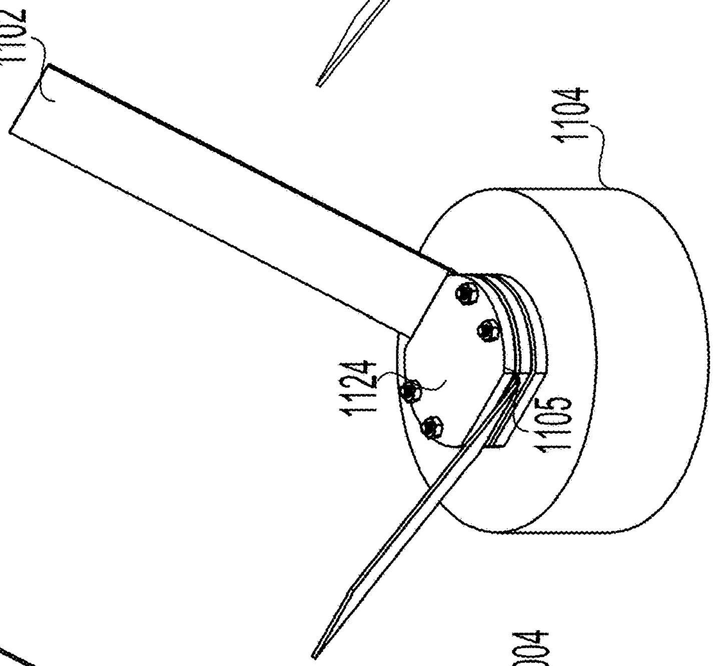

FIG. 11 shows the same light fixture and strap as FIG. 10 but in an assembled state, with the top cover plate 1124 secured to the connection arrangement 1105 to thereby secure the light fixture 1104 to the strap 1102 to both power, control and secure it. FIG. 12 shows an example light fixture 1204 secured to the strap 1202.

Power Source Examples

In the examples described herein, the strap may run on a constant voltage power source. In such examples, only one end of the strap needs to be connected to the power supply. The other end, opposite the end with the power supply, can be closed with non-power connector only. For example, the strap may be cut at whichever desired length and then a metal bar or other electrical conductive material is placed across the two respective lines of conductive material to close the circuit.

In such examples, the electrical may be connected to soldering only, hold down by plastic/non-power clip.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertain that variations and modifications of the various implementations shown and described herein may be made without departing from the spirit and scope of the embodiments. Accordingly, it is intended that the embodiments be limited only to the extent required by the applicable rules of law.

What is claimed is:

1. A modular lighting system, comprising:

a flexible fabric ribbon with a length longer than a width, wherein the flexible fabric ribbon includes two parallel lines of conductive material running substantially along the length;

wherein the flexible fabric ribbon is configured to contact a power source at a first end of the flexible fabric ribbon in electrical communication with the two parallel lines of conductive material of the flexible fabric ribbon;

a light source configured with a pair of parallel, non-piercing, surface electrical contacts, wherein the pair of parallel, non-piercing surface electoral contacts are spring mounted to the light source, wherein the light source includes a clamp, wherein the clamp includes a hinged resistance arm which is configured to open and allow the flexible fabric ribbon to slide within the clamp, and also configured to close to secure the flexible fabric ribbon within the clamp.

2. The modular lighting system of claim 1 wherein the flexible fabric ribbon is woven.

3. The modular lighting system of claim 2 wherein the two parallel lines of conductive material include steel threads.

4. The modular lighting system of claim 1 wherein the power source is a constant voltage power source with an on/off switch.

5. The modular lighting system of claim 1 wherein the light source includes an LED light in electrical communication with the pair of surface electrical contacts.

6. The modular lighting system of claim 1 further including an opposite end bar connecting the pair of parallel woven conductive material on a second end of the flexible fabric ribbon opposite the first end of the power source.

7. The modular lighting system of claim 1 wherein the pair of surface electrical contacts include spring mounts to bias each surface electrical contact away from the light source to better connect to the flexible ribbon pair of parallel woven conductive material.

* * * * *